US011894178B2

(12) United States Patent
Annen

(10) Patent No.: US 11,894,178 B2
(45) Date of Patent: *Feb. 6, 2024

(54) COIL COMPONENT

(71) Applicant: Murata Manufacturing Co., Ltd., Kyoto-fu (JP)

(72) Inventor: Kazunori Annen, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 254 days.

This patent is subject to a terminal disclaimer.

(21) Appl. No.: 17/178,314

(22) Filed: Feb. 18, 2021

(65) Prior Publication Data

US 2021/0175008 A1 Jun. 10, 2021

Related U.S. Application Data

(62) Division of application No. 16/125,285, filed on Sep. 7, 2018, now Pat. No. 10,957,479.

(30) Foreign Application Priority Data

Sep. 12, 2017 (JP) ................................ 2017-175101

(51) Int. Cl.

*H01F 27/32* (2006.01)
*H01F 27/24* (2006.01)
(Continued)

(52) U.S. Cl.

CPC ....... *H01F 27/324* (2013.01); *H01F 17/0013* (2013.01); *H01F 27/24* (2013.01);
(Continued)

(58) Field of Classification Search

CPC .... H01F 27/324; H01F 17/0013; H01F 27/24; H01F 27/2804; H01F 2017/0066;
(Continued)

(56) References Cited

U.S. PATENT DOCUMENTS 6,054,914 A 4/2000 Abel et al.
6,198,374 B1 3/2001 Abel
(Continued)

FOREIGN PATENT DOCUMENTS

CN 208157222 U 11/2018
JP 2013-062459 A 4/2013

OTHER PUBLICATIONS

An Office Action mailed by the China National Intellectual Property Administration dated Aug. 5, 2020, which corresponds to Chinese Patent Application No. 201810190373.8 and is related to U.S. Appl. No. 16/125,285 with English language translation.

*Primary Examiner* — Mang Tin Bik Lian
(74) *Attorney, Agent, or Firm* — Studebaker & Brackett PC

(57) ABSTRACT

A coil component includes a first outer magnetic body, a first outer insulator, a first inner magnetic body, an inner insulator, a second inner magnetic body, a second outer insulator, and a second outer magnetic body stacked sequentially, and a coil in the inner insulator and an internal magnetic body inside the coil. Volumes A, B, C, and D of the first and second outer insulators, the inner insulator, the coil, and the internal magnetic body, respectively, and volume E of the first outer magnetic body, the first inner magnetic body, the second inner magnetic body, and the second outer magnetic body satisfy $0.05 \leq A \leq 0.07$, $0.2 \leq B \leq 0.4$, $0.01 \leq C \leq 0.08$, $0.03 \leq D \leq 0.05$, and $\leq 0.4 \leq E \leq 0.71$, where $0.05B \leq C \leq 0.2B$ and $A+B+C+D+E=1$.

6 Claims, 7 Drawing Sheets

(51) Int. Cl.
*H01F 27/28* (2006.01)
*H01F 17/00* (2006.01)

(52) U.S. Cl.
CPC . *H01F 27/2804* (2013.01); *H01F 2017/0066* (2013.01); *H01F 2027/2809* (2013.01)

(58) Field of Classification Search
CPC ............. H01F 2027/2809; H01F 17/04; H01F 27/323; H01F 2017/0093
See application file for complete search history.

(56) References Cited

U.S. PATENT DOCUMENTS 6,710,694 B2 3/2004 Matsuta et al.
7,821,368 B1 10/2010 Yang et al.
8,957,744 B2 2/2015 Yoshino et al.
2003/0134612 A1* 7/2003 Nakayama .......... H01F 17/0013 455/306
2004/0263309 A1 12/2004 Ito et al.
2006/0158301 A1 7/2006 Shinkai et al.
2009/0003191 A1* 1/2009 Inuzuka .............. H01F 17/0013 369/283
2009/0295526 A1* 12/2009 Mikami ................ H01F 41/043 29/602.1
2010/0301966 A1* 12/2010 Yoshino ................... H03H 7/09 336/200
2011/0181384 A1 7/2011 Inuduka et al.
2013/0154786 A1* 6/2013 Nakajima ........... H01F 17/0013 336/200
2013/0229253 A1 9/2013 Inui et al.
2014/0191838 A1* 7/2014 Yoshida .............. H01F 27/2804 336/200
2016/0049234 A1* 2/2016 Kawashima ........ H01F 27/2804 336/200
2016/0181002 A1* 6/2016 Kim ...................... H01F 27/292 336/200
2016/0247623 A1 8/2016 Marusawa et al.
2016/0372254 A1* 12/2016 Harada ............... H01F 27/2804
2019/0080839 A1 3/2019 Annen

* cited by examiner

COIL COMPONENT

CROSS-REFERENCE TO RELATED APPLICATION

This application is a Divisional of U.S. patent application Ser. No. 16/125,285 filed Sep. 7, 2018, which claims benefit of priority to Japanese Patent Application No. 2017-175101, filed Sep. 12, 2017, the entire content of which is incorporated herein by reference.

BACKGROUND

Technical Field

The present disclosure relates to a coil component.

Background Art

An existing coil component is described in Japanese Unexamined Patent Application Publication No. 2013-62459. That is, Japanese Unexamined Patent Application Publication No. 2013-62459 describes a common mode noise filter including at least a first insulating layer which contains glass and an inorganic filler and in which a plurality of pores are present, a pair of coil conductors where each conductor is disposed on an opposite surface of the first insulating layer, and oxide magnetic layers disposed above and below the first insulating layer provided with the pair of the coil conductors. In the common mode noise filter described in Japanese Unexamined Patent Application Publication No. 2013-62459, second insulating layers which contain glass and an inorganic filler and in which a plurality of pores are present are disposed between the first insulating layer provided with the pair of coil conductors and the oxide magnetic layers.

In the common mode noise filter described in Japanese Unexamined Patent Application Publication No. 2013-62459, each of the oxide magnetic layers disposed above and below the first insulating layer provided with the pair of the coil conductors has a configuration in which a plurality of layers are disposed with two insulating layers containing a glass component interposed therebetween. When such a configuration is adopted, the firing shrinkage behavior of the oxide magnetic layers composed of a material different from the first insulating layer approaches the firing shrinkage behavior of the first insulating layer so as to provide advantages in integral co-firing.

When the firing shrinkage behavior of the oxide magnetic layers with the insulating layers containing a glass component interposed therebetween approaches the firing shrinkage behavior of the first and second insulating layers including the coil conductor, not only simple interposition of the insulating layers containing a glass component between the oxide magnetic layers, but also adjustment of the locations and the volumes of the insulating layers containing a glass component in accordance with the proportion of the coil conductor included in the first and second insulating layers is necessary. However, there is no description about this factor. In particular, when the coil conductor is produced by a plating method, the coil conductor hardly shrinks during firing. Therefore, if the locations and the volumes of the insulating layers which contain a glass component and which are interposed between the oxide magnetic layers are not optimized, cracking and chipping occur in a product due to a difference in firing shrinkage behavior.

The present inventor performed intensive investigations and, as a result, found that the locations and volumes of the insulating layers containing a glass component had to be changed relative to the first and second insulating layers in accordance with the proportion of the coil conductor included in the first and second insulating layers.

SUMMARY

Accordingly, the present disclosure provides a coil component enabling suppression of occurrences of cracking and chipping in a product.

According to preferred embodiments of the present disclosure, a coil component includes a first outer magnetic body, a first outer insulator, a first inner magnetic body, an inner insulator, a second inner magnetic body, a second outer insulator, and a second outer magnetic body which are stacked sequentially in the stacking direction. The coil component further includes a coil disposed in the inner insulator, and an internal magnetic body that is disposed inside the inner circumference of the coil in the inner insulator and that is connected to the first inner magnetic body and the second inner magnetic body. Regarding the relationship between volume A of the first outer insulator and the second outer insulator, volume B of the inner insulator, volume C of the coil, volume D of the internal magnetic body, and volume E of the first outer magnetic body, the first inner magnetic body, the second inner magnetic body, and the second outer magnetic body, about $0.05 \le A \le$ about 0.07, about $0.2 \le B \le$ about 0.4, about $0.01 \le C \le$ about 0.08, about $0.03 \le D \le$ about 0.05, and about $0.4 \le E \le$ about 0.71 are satisfied, where $0.05B \le C \le 0.2B$ and $A+B+C+D+E=1$.

According to the coil component of the above-described embodiment, occurrences of cracking and chipping in a product can be suppressed.

In an embodiment of the coil component, preferably, about $0.055 \le A \le$ about 0.068, about $0.25 \le B \le$ about 0.35, about $0.015 \le C \le$ about 0.04, about $0.03 \le D \le$ about 0.05, and about $0.492 \le E \le$ about 0.65 are satisfied. According to this embodiment, occurrences of cracking and chipping in a product can be further suppressed.

According to preferred embodiments of the present disclosure, a coil component includes a first outer magnetic body, a first outer insulator, a first inner magnetic body, an inner insulator, a second inner magnetic body, a second outer insulator, and a second outer magnetic body which are stacked sequentially in the stacking direction, and a coil disposed in the inner insulator. Regarding the relationship between volume A of the first outer insulator and the second outer insulator, volume B of the inner insulator, volume C of the coil, and volume E of the first outer magnetic body, the first inner magnetic body, the second inner magnetic body, and the second outer magnetic body, about $0.06 \le A \le$ about 0.08, about $0.2 \le B \le$ about 0.4, about $0.01 \le C \le$ about 0.08, and about $0.44 \le E \le$ about 0.73 are satisfied, where $0.05B \le C \le 0.2B$ and $A+B+C+E=1$.

According to the coil component of the above-described embodiment, occurrences of cracking and chipping in a product can be suppressed.

In an embodiment of the coil component, preferably, about $0.065 \le A \le$ about 0.075, about $0.2 \le B \le$ about 0.3, about $0.02 \le C \le$ about 0.035, and about $0.59 \le E \le$ about 0.715 are satisfied. According to the coil component of this embodiment, occurrences of cracking and chipping in a product can be further suppressed.

According to preferred embodiments of the present disclosure, a coil component includes a first outer insulator, a first inner magnetic body, an inner insulator, a second inner magnetic body, and a second outer insulator which are stacked sequentially in the stacking direction, and a coil disposed in the inner insulator. Regarding the relationship between volume A of the total of the first outer insulator and the second outer insulator, volume B of the inner insulator, volume C of the coil, and volume E of the first inner magnetic body and the second inner magnetic body, about $0.05 \leq A \leq$ about 0.25, about $0.15 \leq B \leq$ about 0.25, about $0.032 \leq C \leq$ about 0.18, and about $0.33 \leq E \leq$ about 0.77 are satisfied, where $0.2B \leq C \leq 0.7B$ and $A+B+C+E=1$.

According to the coil component of the above-described embodiment, occurrences of cracking and chipping in a product can be suppressed.

In an embodiment of the coil component, preferably, about $0.1 \leq A \leq$ about 0.2, about $0.175 \leq B \leq$ about 0.225, about $0.037 \leq C \leq$ about 0.16, and about $0.42 \leq E \leq$ about 0.69 are satisfied. According to this embodiment, occurrences of cracking and chipping in a product can be further suppressed.

In an embodiment of the coil component, regarding the relationship between volume A1 of the first outer insulator, volume A2 of the second outer insulator, volume C1 of the coil that is located nearer than the central plane of the inner insulator in the stacking direction to the first outer insulator, and volume C2 of the coil that is located nearer than the central plane of the inner insulator in the stacking direction to the second outer insulator, preferably, C1 is different from C2, and A1:A2=C2:C1 is satisfied. According to this embodiment, even when volume C1 of the coil is different from volume C2 of the coil, peeling between the first inner magnetic body and the inner insulator and peeling between the second inner magnetic body and the inner insulator can be suppressed.

In an embodiment of the coil component, preferably, the number of turns of the coil located nearer than the central plane of the inner insulator in the stacking direction to the first outer insulator is different from the number of turns of the coil that is located nearer than the central plane of the inner insulator in the stacking direction to the second outer insulator. According to the this embodiment, the characteristics of the coil can be optionally changed by making the number of turns of the coil in the first outer insulator side differ from the number of turns of the coil in the second outer insulator side.

Other features, elements, characteristics and advantages of the present disclosure will become more apparent from the following detailed description of preferred embodiments of the present disclosure with reference to the attached drawings.

DETAILED DESCRIPTION

Figure 1:
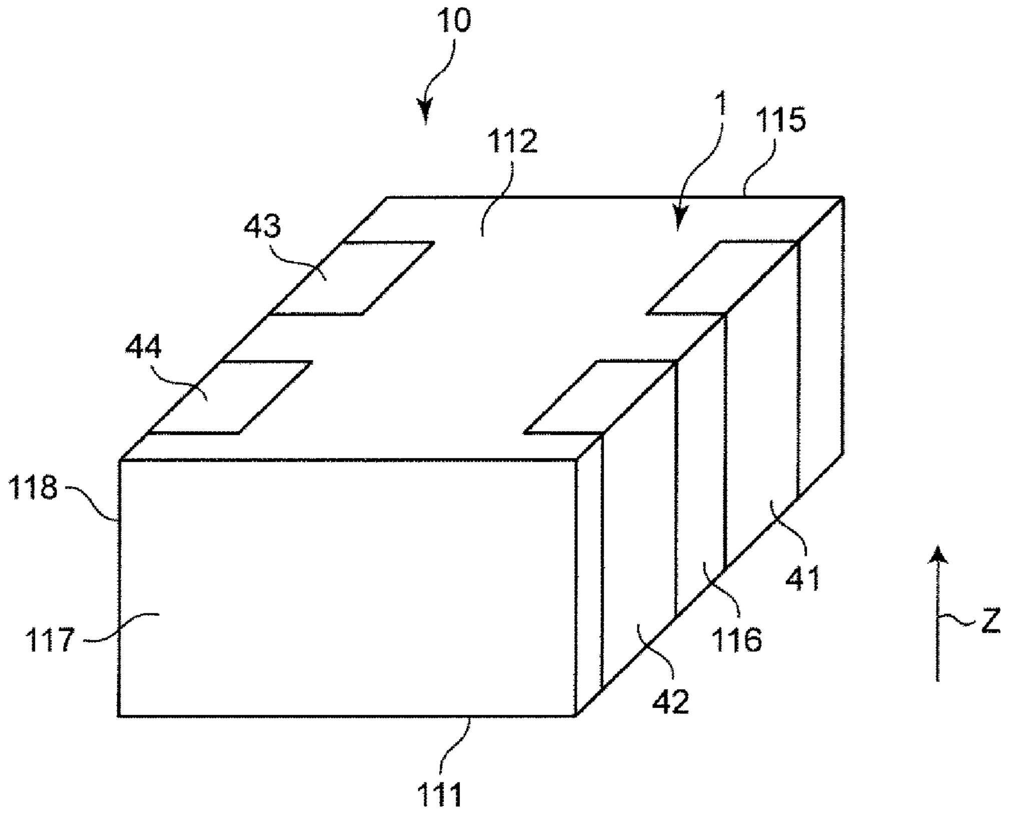
FIG. 1 is a perspective view showing a coil component according to a first embodiment of the present disclosure.

The present disclosure will be described below in detail with reference to the embodiments shown in the drawings. In this regard, the shapes, arrangements, and the like of the coil component and constituents according to the present disclosure are not limited to the embodiments described below or to the illustrated configurations, and the design can be changed within the scope of the present disclosure.

First Embodiment

Figure 2:
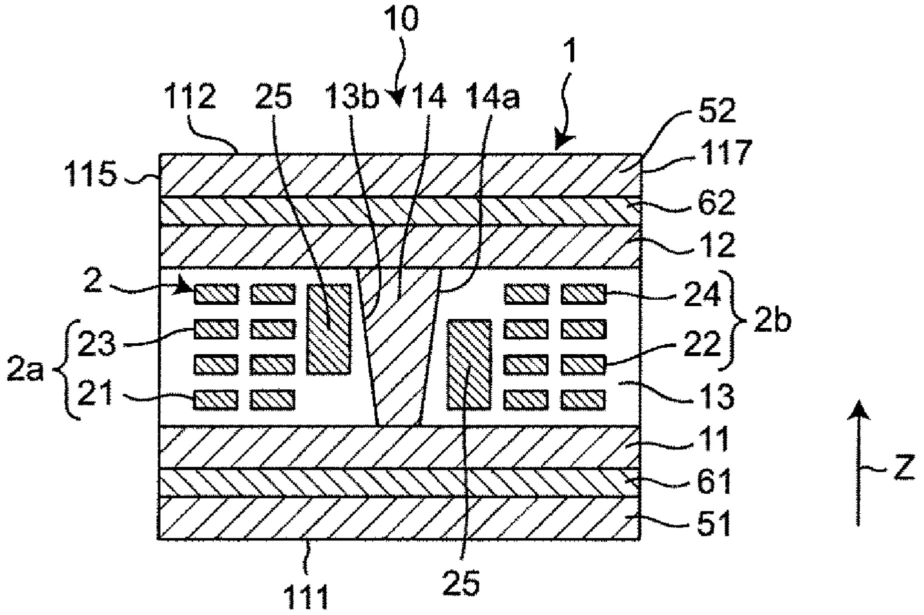
FIG. 2 is a sectional view showing a coil component.
Figure 3:
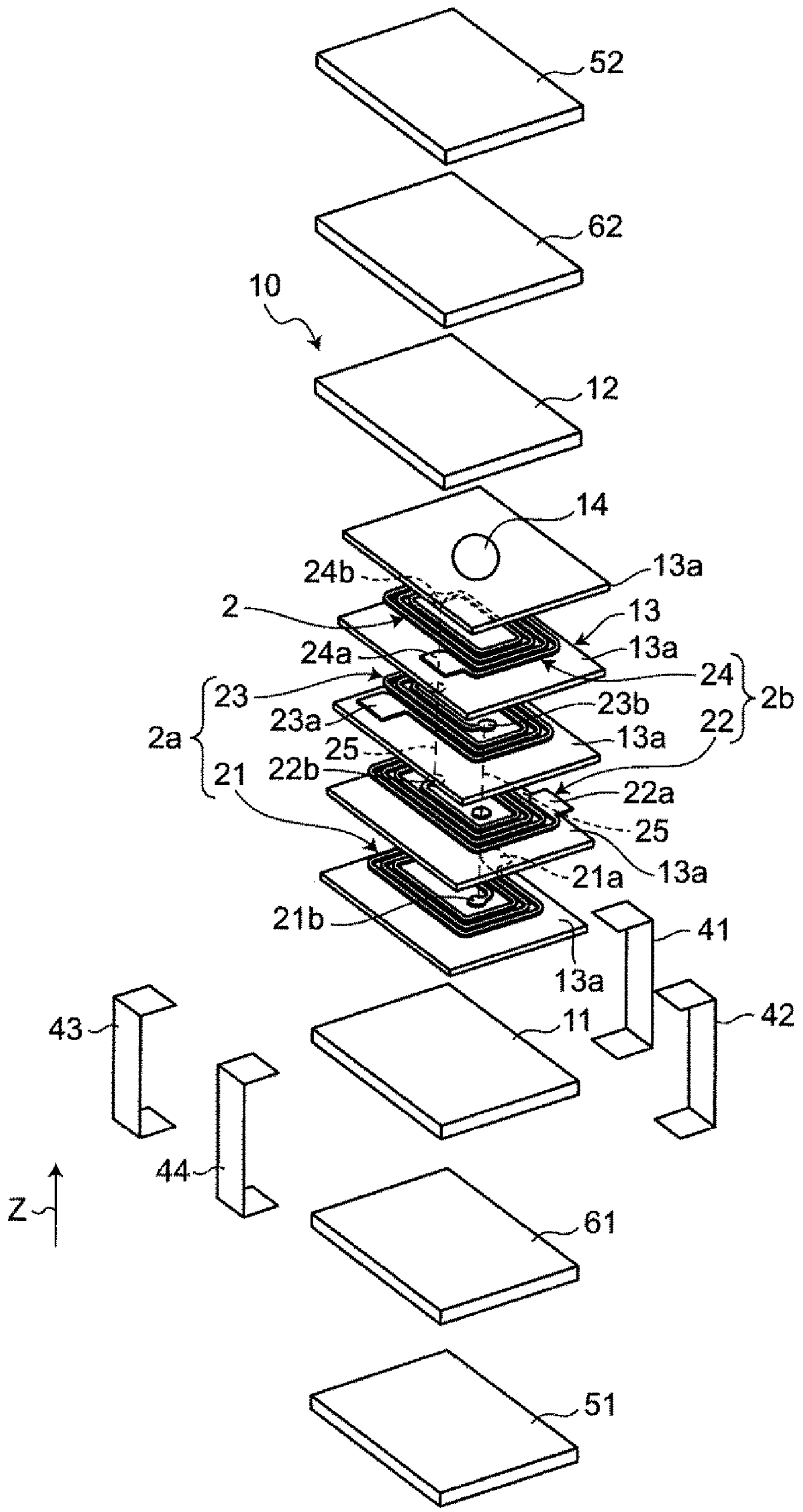
FIG. 3 is an exploded perspective view showing a coil component.

FIG. 1 is a perspective view showing a coil component according to a first embodiment of the present disclosure. FIG. 2 is a sectional view showing the coil component. FIG. 3 is an exploded perspective view showing the coil component. As shown in FIGS. 1 to 3, a coil component 10 includes a multilayer body 1, a coil 2 disposed inside the multilayer body 1, and first to fourth outer electrodes 41 to 44 disposed on the surface of the multilayer body 1.

The coil component 10 is a common mode choke coil. In this regard, the coil component according to the present embodiment is not limited to the common mode choke coil and may include a single coil. The coil component 10 may be mounted in electronic equipment, e.g., a personal computer, a DVD player, a digital camera, a television, a cellular phone, and car electronics.

The multilayer body 1 includes a first outer magnetic body 51, a first outer insulator 61, a first inner magnetic body 11, an inner insulator 13, a second inner magnetic body 12, a second outer insulator 62, and a second outer magnetic body 52, which are stacked sequentially in the stacking direction (indicated by arrow Z in the drawing). An internal magnetic body 14 is disposed in the inner insulator 13. The first outer magnetic body 51 is located at a lower position, and the second outer magnetic body 52 is located at an upper position. The lower side is mounted on, for example, a mounting substrate.

The first inner magnetic body 11, the second inner magnetic body 12, the first outer magnetic body 51, the second outer magnetic body 52, and the internal magnetic body 14 may contain, for example, Ni—Cu—Zn-based ferrite. Consequently, the high-frequency impedance characteristics of the coil component 10 can be improved. Preferably, the first inner magnetic body 11, the second inner magnetic body 12, the first outer magnetic body 51, the second outer magnetic body 52, and the internal magnetic body 14 are composed of Ni—Cu—Zn-based ferrite. The first inner magnetic body 11, the second inner magnetic body 12, the first outer magnetic body 51, the second outer magnetic body 52, and the internal magnetic body 14 may have the same composition or compositions different from each other.

Preferably, the Ni—Cu—Zn-based ferrite contains Fe, Ni, Zn, and Cu as primary components and contains Fe as about 40% to 49.5% by mole of $Fe_2O_3$, Zn as about 5% to 35% by mole of ZnO, and Cu as about 6% to 13% by mole of CuO, where the remainder is Ni (in the form of NiO). In addition, additives may be included, and it is preferable that Si as $SiO_2$ in a mole fraction of about 1.0 to 3.0 parts and Mn as $Mn_3O_4$ in a mole fraction of about 0.05 to 1.0 parts be included relative to 100 parts of $Fe_2O_3$+ZnO+CuO+NiO.

The first outer insulator 61, the second outer insulator 62, and the inner insulator 13 are composed of, for example, glass containing alkali borosilicate glass and can decrease the dielectric constant, reduce the stray capacitance of the coil, and improve the high-frequency characteristics. The inner insulator 13 is formed by stacking a plurality of insulating layers 13*a*.

The alkali borosilicate glass contains at least Si, B, and K, where Si as about 65% to 85% by mole of $SiO_2$, B as about 20% to 30% by mole of $B_2O_3$, and K as about 0.5% to 2.0% by mole of $K_2O$ are included. In addition, it is preferable that Al as $Al_2O_3$ in a mole fraction of about 0.5 to 1.5 parts and Mg as MgO in a mole fraction of about 1.0 to 3.0 parts be included relative to 100 parts of $SiO_2$+$B_2O_3$+$K_2O$. Regarding the alkali borosilicate glass, a predetermined ratio of $SiO_2$—$B_2O_3$—$K_2O$ glass may be produced, and $SiO_2$ serving as a filler may be added thereto. That is, the final ratio of Si, B, and K has only to fall within the above-described range.

The internal magnetic body 14 is disposed inside the inner circumference of the coil 2 in the inner insulator 13 and is connected to the first inner magnetic body 11 and the second inner magnetic body 12. Specifically, a hole 13*b* that passes through the inner insulator 13 in the stacking direction is located in a portion inside the inner circumference of the coil 2 in the inner insulator 13. The internal magnetic body 14 is disposed inside the hole 13*b*. In a cross section parallel to the stacking direction, the width of the internal magnetic body 14 increases continuously from the first inner magnetic body 11 side toward the second inner magnetic body 12 side. That is, the inner diameter of the hole 13*b* located inside the inner insulator 13 increases continuously from the first inner magnetic body 11 side toward the second inner magnetic body 12 side in a direction parallel to the stacking direction, and the internal magnetic body 14 is disposed along the inner circumference of the hole 13*b*.

The shape of the multilayer body 1 is a substantially rectangular parallelepiped. The surface of the multilayer body 1 is composed of a first end surface 111, a second end surface 112, a first side surface 115, a second side surface 116, a third side surface 117, and a fourth side surface 118. The first end surface 111 and the second end surface 112 are located opposite to each other in the stacking direction. The first to fourth side surfaces 115 to 118 are located substantially perpendicular to the first end surface 111 and the second end surface 112. The first end surface 111 is located at a lower position in the stacking direction, and the second end surface 112 is located at an upper position.

The multilayer body 1 is a substantially rectangular parallelepiped having a length L of about 0.80±0.10 mm, a width W of about 0.60±0.10 mm, and a height T of about 0.45±0.05 mm or a substantially rectangular parallelepiped having a length L of about 0.60±0.10 mm, a width W of about 0.50±0.10 mm, and a height T of about 0.35±0.05 mm.

The coil 2 is disposed inside the inner insulator 13. The coil 2 includes a primary coil 2*a* and a secondary coil 2*b* magnetically coupled to each other. The primary coil 2*a* and the secondary coil 2*b* are disposed so as to overlap one another in the stacking direction of the multilayer body 1.

The primary coil 2*a* includes a first coil conductor layer 21 and a third coil conductor layer 23 electrically connected to each other. The secondary coil 2*b* includes a second coil conductor layer 22 and a fourth coil conductor layer 24 electrically connected to each other.

The first to fourth coil conductor layers 21 to 24 are arranged sequentially in the stacking direction. That is, two coil conductor layers (first coil conductor layer 21 and third coil conductor layer 23) constituting the primary coil 2*a* and two coil conductor layers (second coil conductor layer 22 and fourth coil conductor layer 24) constituting the secondary coil 2*b* are arranged alternately in the stacking direction. The first to fourth coil conductor layers 21 to 24 are disposed on the respective insulating layers 13*a* different from each other. The first to fourth coil conductor layers 21 to 24 may be composed of an electrically conductive material, for example, Ag, Ag—Pd, Cu, or Ni. The first to fourth coil conductor layers 21 to 24 may have the same composition or compositions different from each other.

The first to fourth coil conductor layers 21 to 24 have a spiral pattern which is a spiral winding on a plane when viewed from above. The center axes of the first to fourth coil conductor layers 21 to 24 are in accord with each other when viewed from above. That is, the first to fourth coil conductor layers 21 to 24 overlap one another in the stacking direction. The characteristics of the coil component 10 can be optionally changed because such a configuration is adopted.

A first end 21*a* of the first coil conductor layer 21 extends outside the outer circumference of the spiral pattern, and a second end 21*b* of the first coil conductor layer 21 is located inside the inner circumference of the spiral pattern. Likewise, the second coil conductor layer 22 has a first end 22*a* and a second end 22*b*, the third coil conductor layer 23 has a first end 23*a* and a second end 23*b*, and the fourth coil conductor layer 24 has a first end 24*a* and a second end 24*b*. The first end 21*a* of the first coil conductor layer 21 is exposed at the second side surface 116 at a position near the first side surface 115. The first end 22*a* of the second coil conductor layer 22 is exposed at the second side surface 116 at a position near the third side surface 117. The first end 23*a* of the third coil conductor layer 23 is exposed at the fourth side surface 118 at a position near the first side surface 115. The first end 24*a* of the fourth coil conductor layer 24 is exposed at the fourth side surface 118 at a position near the third side surface 117.

The second end 21*b* of the first coil conductor layer 21 is electrically connected to the second end 23*b* of the third coil conductor layer 23 with a connection conductor 25, which passes through the insulating layer 13*a*, interposed therebetween. Likewise, the second end 22*b* of the second coil conductor layer 22 is electrically connected to the second end 24*b* of the fourth coil conductor layer 24 with a connection conductor 25, which passes through the insulating layer 13*a*, interposed therebetween. As described above, the coil 2 is composed of the first to fourth coil conductor layers 21 to 24 and the connection conductors 25.

In the coil component 10 shown in FIGS. 1 to 3, each of the primary coil 2*a* and the secondary coil 2*b* is composed of two flat-surface coils. However, at least one of the primary coil 2*a* and the secondary coil 2*b* may be composed of one flat-surface coil or three or more flat-surface coils. In addition, in the coil component 10 shown in FIGS. 1 to 3, the coil 2 includes four coil conductor layers, but the coil 2 has only to include at least one coil conductor layer. In the coil component 10 shown in FIGS. 1 to 3, the shapes of all the coil conductor layers are the same. However, the shape of at least one coil conductor layer may be different from the shapes of the other coil conductor layers.

The first to fourth outer electrodes 41 to 44 may be composed of an electrically conductive material, for example, Ag, Ag—Pd, Cu, or Ni. The first to fourth outer electrodes 41 to 44 may have the same composition or compositions different from each other. The first to fourth outer electrodes 41 to 44 may be formed by, for example, coating the surface of the multilayer body 1 with the electrically conductive material and performing baking.

The first outer electrode 41 is disposed on the second side surface 116 at a position near the first side surface 115. One end of the first outer electrode 41 extends to the first end surface 111, and the other end of the first outer electrode 41 extends to the second end surface 112. In other words, the shape of the first outer electrode 41 on the surface of the multilayer body 1 is substantially the shape of the letter U. The first outer electrode 41 is electrically connected to the first end 21*a* of the first coil conductor layer 21.

Likewise, the second outer electrode 42 is disposed on the second side surface 116 at a position near the third side surface 117 and is electrically connected to the first end 22*a* of the second coil conductor layer 22. The third outer electrode 43 is disposed on the fourth side surface 118 at a position near the first side surface 115 and is electrically connected to the first end 23*a* of the third coil conductor layer 23. The fourth outer electrode 44 is disposed on the fourth side surface 118 at a position near the third side surface 117 and is electrically connected to the first end 24*a* of the fourth coil conductor layer 24.

The relationship between volume A of the total of the first outer insulator 61 and the second outer insulator 62, volume B of the inner insulator 13, volume C of the coil 2, volume D of the internal magnetic body 14, and volume E of the total of the first outer magnetic body 51, the first inner magnetic body 11, the second inner magnetic body 12, and the second outer magnetic body 52 will be described. About $0.05 \leq A \leq$ about 0.07, about $0.2 \leq B \leq$ about 0.4, about $0.01 \leq C \leq$ about 0.08, about $0.03 \leq D \leq$ about 0.05, and about $0.4 \leq E \leq$ about 0.71 are satisfied, where $0.05B \leq C \leq 0.2B$ and $A+B+C+D+E=1$. That is, when each of A, B, C, and D is a minimum value, E is a maximum value, and when each of A, B, C, and D is a maximum value, E is a minimum value.

In the present embodiment, the volume of the first outer insulator 61 is substantially equal to the volume of the second outer insulator 62. In other words, the thickness of the first outer insulator 61 is substantially equal to the thickness of the second outer insulator 62. The volume of the first outer magnetic body 51 is substantially equal to the volume of the second outer magnetic body 52, and the thickness of the first outer magnetic body 51 and the thickness of the second outer magnetic body 52 are substantially equal. The volume of the first inner magnetic body 11 is substantially equal to the volume of the second inner magnetic body 12, and the thickness of the first inner magnetic body 11 and the thickness of the second inner magnetic body 12 are substantially equal.

Meanwhile, the volume (thickness) of the first outer magnetic body 51 and the volume (thickness) of the first inner magnetic body 11 are not limited to being substantially equal but are preferably substantially equal. The same applies to the relationship between the volume (thickness) of the second outer magnetic body 52 and the volume (thickness) of the second inner magnetic body 12.

Figure 4:
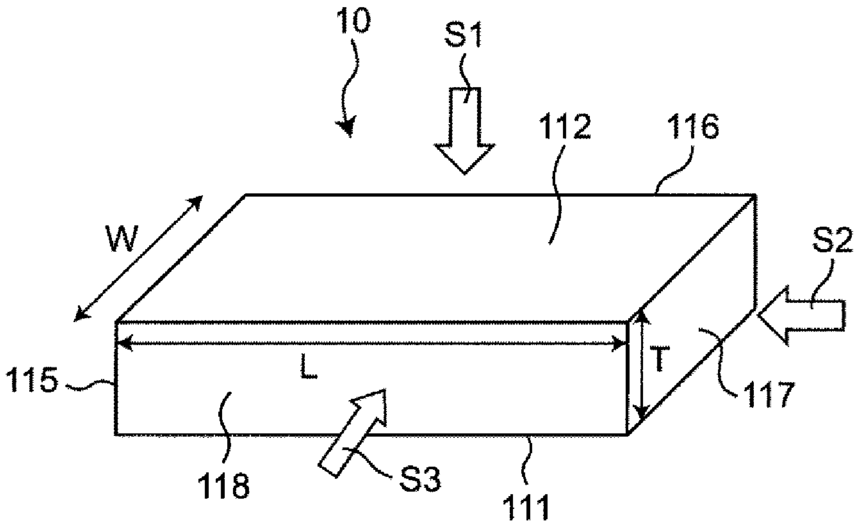
FIG. 4 is an explanatory diagram illustrating calculation of a volume of each member of a coil component.

The method for measuring the volume of each member will be described. As shown in FIG. 4, the second end surface 112 (LW surface) of the coil component 10 is polished gradually and is observed in the direction of arrow S1 orthogonal to the second end surface 112 (stacking direction). Then, as shown in FIG. 3, the coil conductor layer, the connection conductor, and the internal magnetic body are observed from above, and the area of each member is measured by using a length-measuring function or the like provided in a microscope. In this regard, the value produced by multiplying length L of the multilayer body 1 by width W is used for the areas of the outer insulator, the outer magnetic body, and the inner magnetic body.

The fourth side surface 118 (LT surface) of the coil component 10 is polished up to the vicinity of the center in the direction of width W of the multilayer body, and the thickness of each of the coil conductor layer, the connection conductor, the internal magnetic body, the outer insulator, the outer magnetic body, the inner magnetic body, and the inner insulator is measured in the direction of arrow S3 orthogonal to the fourth side surface 118. Thereafter, the volume of each member is determined by calculating the product of the respective area and thickness measured. In this regard, the area of the internal magnetic body increases continuously from the first inner magnetic body side toward the second inner magnetic body and, therefore, the volume is determined by a calculation in accordance with the area in the first inner magnetic body side, the area in the second inner magnetic body side, and the height.

The volume of the inner insulator is determined by subtracting the volume of the coil conductor layers and the volume of the internal magnetic body from the volume determined by a calculation in accordance with length L and width W of the multilayer body 1 and the measured thickness at the polished surface, in the same manner as for the outer insulator, the outer magnetic body, and the inner magnetic body.

According to the above-described coil component 10, when volume C of the coil 2 is 5% or more and 20% or less (i.e., from 5% to 20%) of volume B of the inner insulator 13, from the viewpoint of firing shrinkage behavior, differences in firing shrinkage behavior between the inner insulator 13 and the magnetic bodies 11, 12, 51, and 52 are reduced by interposing the first outer insulator 61 and the second outer insulator 62 between the magnetic bodies 11, 12, 51, and 52. That is, occurrences of cracking and chipping in a product can be suppressed by adopting the above-described volume ratios of A, B, C, D, and E. In particular, occurrences of cracking and chipping between the inner insulator 13 and the first inner magnetic body 11 and between the inner insulator 13 and the second inner magnetic body 12 can be suppressed.

Further preferably, about $0.055 \leq A \leq$ about 0.068, about $0.25 \leq B \leq$ about 0.35, about $0.015 \leq C \leq$ about 0.04, about $0.03 \leq D \leq$ about 0.05, and about $0.492 \leq E \leq$ about 0.65 are satisfied. Accordingly, occurrences of cracking and chipping in a product can be further suppressed. In particular, occurrences of peeling between the inner insulator 13 and the first inner magnetic body 11 and between the inner insulator 13 and the second inner magnetic body 12 are further suppressed, and entry of moisture is suppressed. As a result, the insulating property of the insulating layer 13*a* at high temperatures and in high humidity is improved, and a possibility of a short circuit occurring in the coil conductor layers composed of the primary coil 2*a* and the secondary coil 2*b* can be reduced.

Next, a method for manufacturing the coil component 10 will be described.

As shown in FIG. 2 and FIG. 3, the first outer insulator 61 and the first inner magnetic body 11 are stacked sequentially on the first outer magnetic body 51. Subsequently, a plurality of insulating layers 13*a* provided with the respective coil conductor layers 21 to 24 by plating are stacked sequentially on the first inner magnetic body 11. As a result, the inner insulator 13 in which the coil 2 is disposed is stacked on the first inner magnetic body 11.

Thereafter, a laser is applied from above the inner insulator 13 in a downward direction so as to form a hole 13*b* that passes vertically through the inner insulator 13. The hole 13*b* may be formed by mechanical processing other than by laser.

Subsequently, the resulting hole 13*b* is filled with the internal magnetic body 14, and the second inner magnetic body 12, the second outer insulator 62, and the second outer magnetic body 52 are stacked sequentially on the inner insulator 13 so as to form the multilayer body 1. The multilayer body 1 is fired, and the outer electrodes 41 to 44 are disposed on the multilayer body 1 so as to produce the coil component 10.

Second Embodiment

Figure 5:
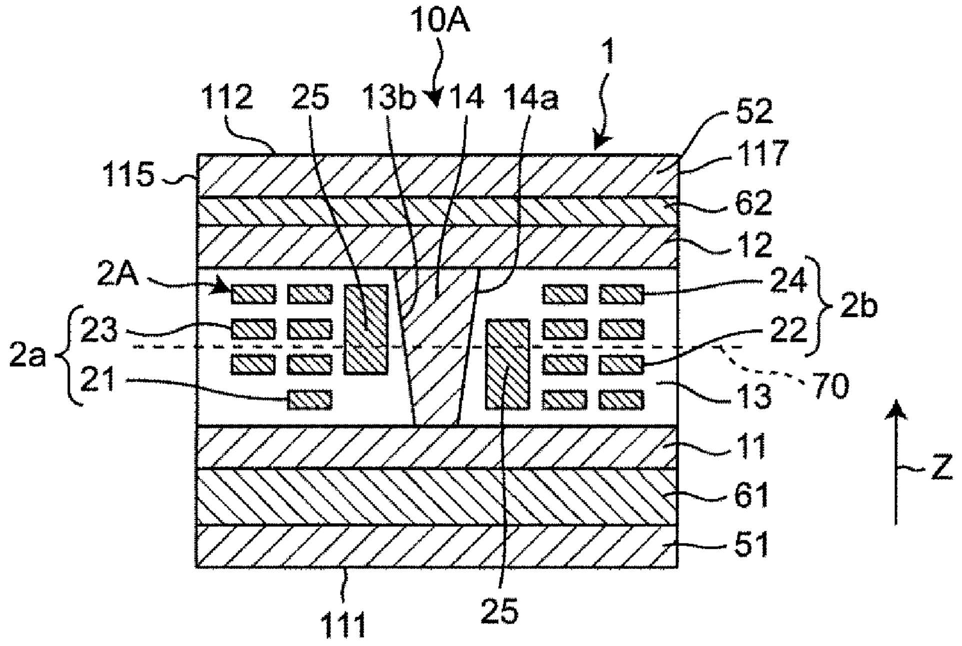
FIG. 5 is a sectional view showing a coil component according to a second embodiment of the present disclosure.

FIG. 5 is a sectional view showing a coil component according to a second embodiment of the present disclosure. The second embodiment is different from the first embodiment in that the volume of the upper portion of the coil is different from the volume of the lower portion and the volume (thickness) of the first outer insulator 61 is not substantially equal to the volume (thickness) of the second outer insulator 62. The differences in the configuration will be described below. The other configurations are the same as the configurations in the first embodiment and are denoted by the same reference numerals as those in the first embodiment, and explanations thereof will not be provided.

As shown in FIG. 5, in the coil component 10A according to the second embodiment, volume C1 of a coil 2A that is located nearer than the central plane 70 of the inner insulator 13 in the stacking direction to the first outer insulator 61 (hereafter referred to as volume C1 of the lower portion of the coil 2A) is different from volume C2 of the coil 2A that is located nearer than the central plane 70 of the inner insulator 13 in the stacking direction to the second outer insulator 62 (hereafter referred to as volume C2 of the upper portion of the coil 2A). That is, the number of turns of the lower portion of the coil 2A is different from the number of turns of the upper portion of the coil 2A.

Specifically, the lower portion of the coil 2A includes a first coil conductor layer 21 and a second coil conductor layer 22. The upper portion of the coil 2A includes a third coil conductor layer 23 and a fourth coil conductor layer 24. The number of turns of the first coil conductor layer 21 is less than the number of turns of the third coil conductor layer 23 and the number of turns of the fourth coil conductor layer 24. Volume C1 of the lower portion of the coil 2A is smaller than volume C2 of the upper portion of the coil 2A.

Regarding the relationship between volume A1 of the first outer insulator 61, volume A2 of the second outer insulator 62, volume C1 of the lower portion of the coil 2A, and volume C2 of the upper portion of the coil 2A, $A1:A2=C2:C1$ is satisfied. That is, volume A1 (thickness) of the first outer insulator 61 is larger than volume A2 (thickness) of the second outer insulator 62.

According to the above-described coil component 10A, when the volume of the lower portion of the coil 2A is smaller than the volume of the upper portion of the coil 2A, a difference in firing shrinkage behavior occurs between the upper portion and the lower portion of the inner insulator 13. The firing shrinkage behavior of the lower portion, in which the volume of the coil 2A is small as described above, of the inner insulator 13 approaches the firing shrinkage behavior of the inner insulator 13. Then, the volume of the first outer insulator 61 that is located at a position near the lower portion of the inner insulator 13 is increased. As a result, the firing shrinkage behavior of the lower portion of the inner insulator 13 can approach the entire firing shrinkage behavior of the first outer magnetic body 51, the first outer insulator 61, and the first inner magnetic body 11, and peeling between the inner insulator 13 and the first inner magnetic body 11 can be suppressed.

In this regard, the volume of the upper portion and the volume of the lower portion of the coil 2A are made to differ from each other by making the number of turns of the upper portion of the coil 2A differ from the number of turns of the lower portion. However, the volume of the upper portion and the volume of the lower portion of the coil 2A may be made to differ from each other by making the thickness or line widths of the upper portion and the thickness or line width of the lower portion of the coil 2A differ from each other.

Third Embodiment

Figure 6:
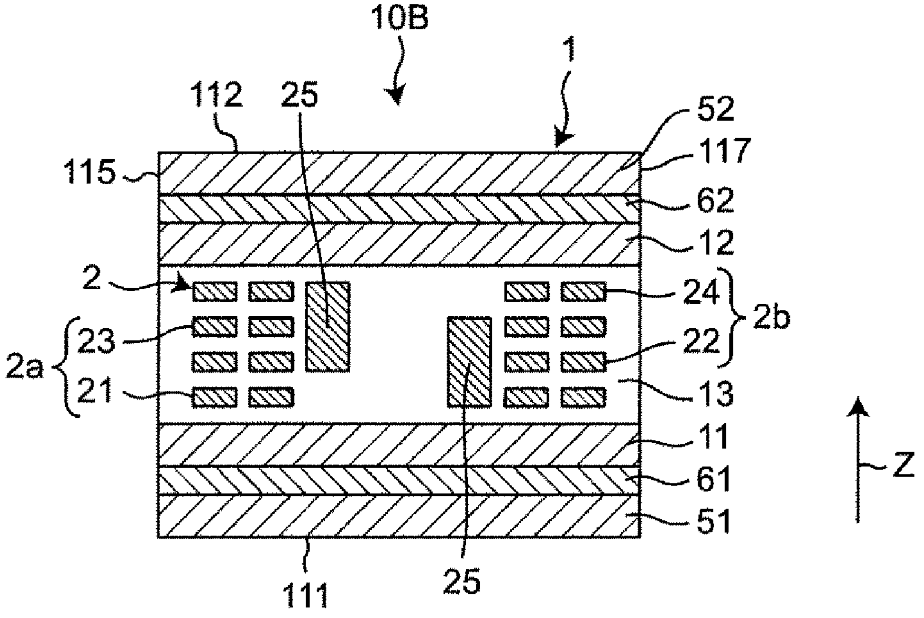
FIG. 6 is a sectional view showing a coil component according to a third embodiment of the present disclosure.

FIG. 6 is a sectional view showing a coil component according to a third embodiment of the present disclosure. The third embodiment is different from the first embodiment in that no internal magnetic body is disposed. The differences in the configuration will be described below. The other configurations are the same as the configurations in the first embodiment and are denoted by the same reference numerals as those in the first embodiment, and explanations thereof will not be provided.

As shown in FIG. 6, a coil component 10B according to the third embodiment includes no internal magnetic body 14 in the first embodiment. The relationship between volume A of the total of the first outer insulator 61 and the second outer insulator 62, volume B of the inner insulator 13, volume C of the coil 2, and volume E of the total of the first outer magnetic body 51, the first inner magnetic body 11, the second inner magnetic body 12, and the second outer magnetic body 52 will be described. About $0.06 \le A \le$ about 0.08, about $0.2 \le B \le$ about 0.4, about $0.01 \le C \le$ about 0.08, and about $0.44 \le E \le$ about 0.73 are satisfied, where $0.05B \le C \le 0.2B$ and $A+B+C+E=1$. That is, when each of A, B, and C is a minimum value, E is a maximum value, and when each of A, B, and C is a maximum value, E is a minimum value.

According to the above-described coil component 10B, occurrences of cracking and chipping in a product can be suppressed, as in the first embodiment, by adopting the above-described volume ratios of A, B, C, and E. In particular, occurrences of cracking and chipping between the inner insulator 13 and the first inner magnetic body 11 and between the inner insulator 13 and the second inner magnetic body 12 can be suppressed.

Further preferably, about $0.065 \le A \le$ about 0.075, about $0.2 \le B \le$ about 0.3, about $0.02 \le C \le$ about 0.035, and about $0.59 \le E \le$ about 0.715 are satisfied. Accordingly, occurrences of cracking and chipping in a product can be further suppressed, as in the first embodiment. In particular, occurrences of peeling between the inner insulator 13 and the first inner magnetic body 11 and between the inner insulator 13 and the second inner magnetic body 12 are further suppressed, and entry of moisture is suppressed. As a result, the insulating property of the insulating layer 13*a* at high temperatures and in high humidity is improved, and a possibility of a short circuit occurring in the coil conductor layers composed of the primary coil 2*a* and the secondary coil 2*b* can be reduced.

Fourth Embodiment

Figure 7:
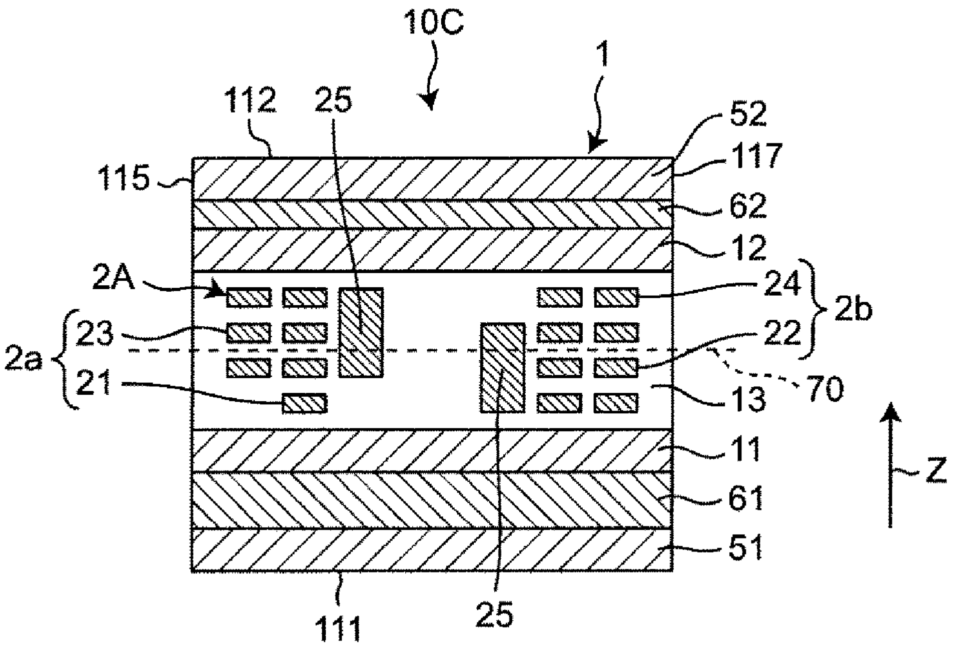
FIG. 7 is a sectional view showing a coil component according to a fourth embodiment of the present disclosure.

FIG. 7 is a sectional view showing a coil component according to a fourth embodiment of the present disclosure.

The fourth embodiment is different from the third embodiment in that the volume of the upper portion of the coil is different from the volume of the lower portion and the volume (thickness) of the first outer insulator 61 is not substantially equal to the volume (thickness) of the second outer insulator 62. The differences in the configuration will be described below. The other configurations are the same as the configurations in the third embodiment and are denoted by the same reference numerals as those in the third embodiment, and explanations thereof will not be provided.

As shown in FIG. 7, in the coil component 10C according to the fourth embodiment, volume C1 of a coil 2A that is located nearer than the central plane 70 of the inner insulator 13 in the stacking direction to the first outer insulator 61 (hereafter referred to as volume C1 of the lower portion of the coil 2A) is different from volume C2 of the coil 2A that is located nearer than the central plane 70 of the inner insulator 13 in the stacking direction to the second outer insulator 62 (hereafter referred to as volume C2 of the upper portion of the coil 2A). That is, the number of turns of the lower portion of the coil 2A is different from the number of turns of the upper portion of the coil 2A.

Specifically, the lower portion of the coil 2A includes a first coil conductor layer 21 and a second coil conductor layer 22. The upper portion of the coil 2A includes a third coil conductor layer 23 and a fourth coil conductor layer 24. The number of turns of the first coil conductor layer 21 is less than the number of turns of the third coil conductor layer 23 and the number of turns of the fourth coil conductor layer 24. Volume C1 of the lower portion of the coil 2A is smaller than volume C2 of the upper portion of the coil 2A. Regarding the relationship between volume A1 of the first outer insulator 61, volume A2 of the second outer insulator 62, volume C1 of the lower portion of the coil 2A, and volume C2 of the upper portion of the coil 2A, $A1{:}A2=C2{:}C1$ is satisfied. That is, volume A1 (thickness) of the first outer insulator 61 is larger than volume A2 (thickness) of the second outer insulator 62.

According to the above-described coil component 10C, when the volume of the lower portion of the coil 2A is smaller than the volume of the upper portion of the coil 2A, a difference in firing shrinkage behavior occurs between the upper portion and the lower portion of the inner insulator 13. The firing shrinkage behavior of the lower portion, in which the volume of the coil 2A is small as described above, of the inner insulator 13 approaches the firing shrinkage behavior of the inner insulator 13. Then, the volume of the first outer insulator 61 that is located at a position near the lower portion of the inner insulator 13 is increased. As a result, the firing shrinkage behavior of the lower portion of the inner insulator 13 can approach the entire firing shrinkage behavior of the first outer magnetic body 51, the first outer insulator 61, and the first inner magnetic body 11, and peeling between the inner insulator 13 and the first inner magnetic body 11 can be suppressed. In this regard, the volume of the upper portion and the volume of the lower portion of the coil 2A are made to differ from each other by making the number of turns of the upper portion of the coil 2A differ from the number of turns of the lower portion. However, the volume of the upper portion and the volume of the lower portion of the coil 2A may be made to differ from each other by making the thickness or line width of the upper portion and the thickness or line width of the lower portion of the coil 2A differ from each other.

Fifth Embodiment

Figure 8:
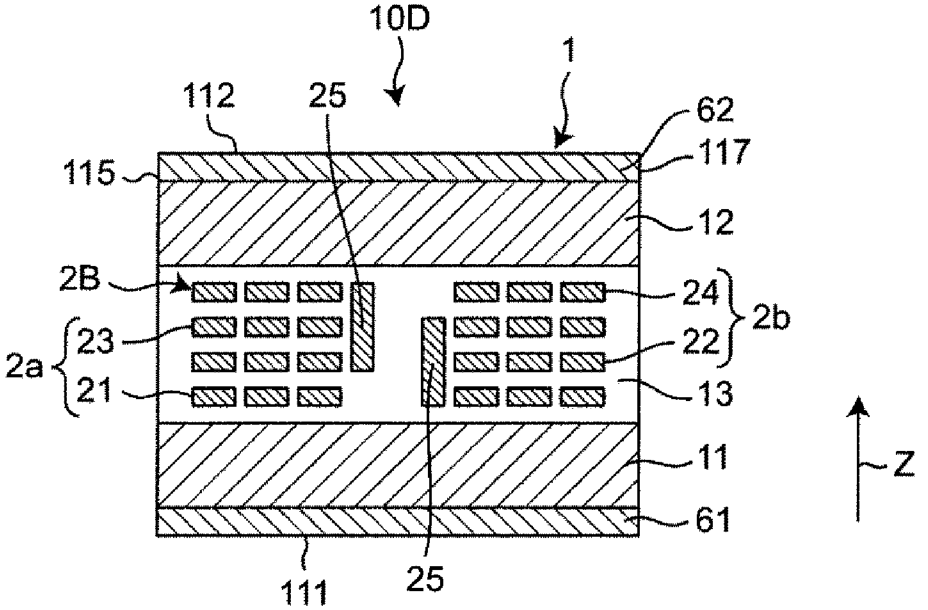
FIG. 8 is a sectional view showing a coil component according to a fifth embodiment of the present disclosure.

FIG. 8 is a sectional view showing a coil component according to a fifth embodiment of the present disclosure. The fifth embodiment is different from the first embodiment in that the internal magnetic body is not disposed, the volume ratio of the coil is changed, and neither the first outer magnetic body nor the second outer magnetic body is disposed. The differences in the configurations will be described below. The other configurations are the same as the configurations in the first embodiment and are denoted by the same reference numerals as those in the first embodiment, and explanations thereof will not be provided.

As shown in FIG. 8, a coil component 10D according to the fifth embodiment includes neither the internal magnetic body 14 nor the first outer magnetic body 51 nor the second outer magnetic body 52 in the first embodiment. The number of turns of coil 2B is more than the number of turns of coil 2 in the first embodiment, and the volume ratio of coil 2B to the inner insulator 13 is larger than the volume ratio of coil 2 to the inner insulator 13 in the first embodiment. The first outer insulator 61 and the second outer insulator 62 are located at outermost positions in the stacking direction. The thickness of each of the first inner magnetic body 11 and the second inner magnetic body 12 is larger than the thickness in the first embodiment.

The relationship between volume A of the total of the first outer insulator 61 and the second outer insulator 62, volume B of the inner insulator 13, volume C of the coil 2B, and volume E of the total of the first inner magnetic body 11 and the second inner magnetic body 12 will be described. About $0.05 \le A \le$ about 0.25, about $0.15 \le B \le$ about 0.25, about $0.032 \le C \le$ about 0.18, and about $0.33 \le E \le$ about 0.77 are satisfied, where $0.2B \le C \le 0.7B$ and $A+B+C+E=1$. That is, when each of A, B, and C is a minimum value, E is a maximum value, and when each of A, B, and C is a maximum value, E is a minimum value.

According to the above-described coil component 10D, when volume C of the coil 2B is more than 20% and 70% or less (i.e., from 20% to 70%) of volume B of the inner insulator 13, from the viewpoint of firing shrinkage behavior, differences in firing shrinkage behavior between the inner insulator 13 and the magnetic bodies 11 and 12 are reduced by setting the first outer insulator 61 and the second outer insulator 62 away from the inner insulator 13. That is, volume B of the inner insulator 13 is decreased because volume C of the coil 2B increases, and the firing shrinkage behavior of the inner insulator 13 is reduced. As a result, the firing shrinkage behavior of the inner insulator 13 approaches the firing shrinkage behavior of the magnetic bodies 11 and 12. Therefore, the firing shrinkage behavior of the inner insulator 13 and the firing shrinkage behavior of the magnetic bodies 11 and 12 are adjusted by setting the first outer insulator 61 and the second outer insulator 62 away from the inner insulator 13.

That is, occurrences of cracking and chipping in a product can be suppressed by adopting the above-described volume ratios of A, B, C, and E. In particular, occurrences of cracking and chipping between the inner insulator 13 and the first inner magnetic body 11 and between the inner insulator 13 and the second inner magnetic body 12 can be suppressed.

Further preferably, about $0.1 \le A \le$ about 0.2, about $0.175 \le B \le$ about 0.225, about $0.037 \le C \le$ about 0.16, and about $0.42 \le E \le$ about 0.69 are satisfied. Accordingly, occurrences of cracking and chipping in a product can be further suppressed. In particular, occurrences of peeling between the inner insulator 13 and the first inner magnetic body 11 and between the inner insulator 13 and the second inner magnetic body 12 are further suppressed, and entry of moisture is suppressed. As a result, the insulating property of the insulating layer 13*a* at high temperatures and in high humidity is improved, and a possibility of a short circuit occurring in the coil conductor layers composed of the primary coil 2*a* and the secondary coil 2*b* can be reduced.

Sixth Embodiment

Figure 9:
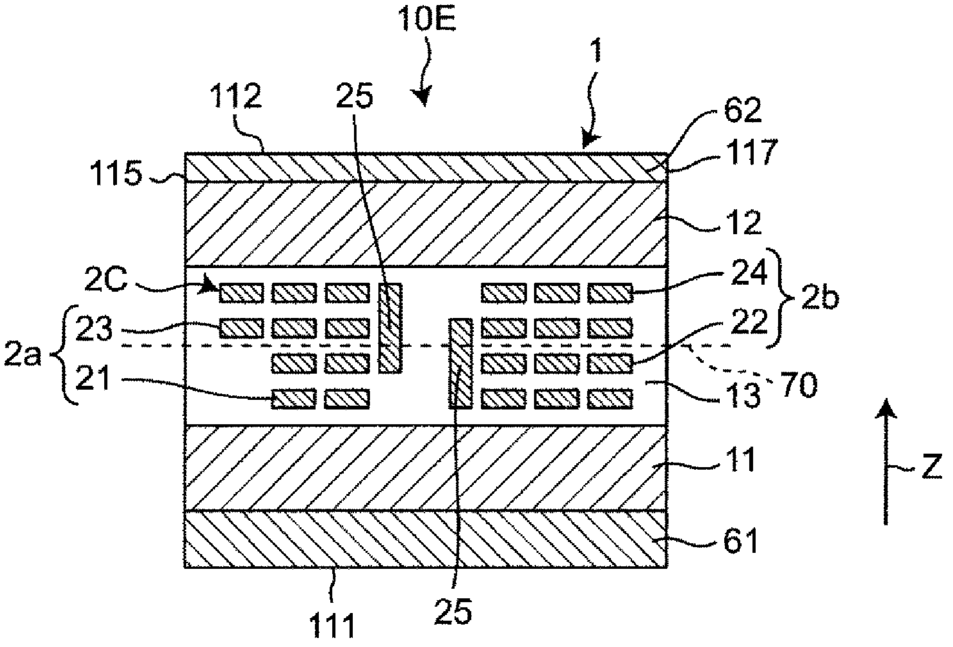
FIG. 9 is a sectional view showing a coil component according to a sixth embodiment of the present disclosure.

FIG. 9 is a sectional view showing a coil component according to a sixth embodiment of the present disclosure. The sixth embodiment is different from the fifth embodiment in that the volume of the upper portion of the coil is different from the volume of the lower portion and the volume (thickness) of the first outer insulator 61 is not substantially equal to the volume (thickness) of the second outer insulator 62. The differences in the configuration will be described below. The other configurations are the same as the configurations in the fifth embodiment and are denoted by the same reference numerals as those in the fifth embodiment, and explanations thereof will not be provided.

As shown in FIG. 9, in the coil component 10E according to the sixth embodiment, volume C1 of a coil 2C that is located nearer than the central plane 70 of the inner insulator 13 in the stacking direction to the first outer insulator 61 (hereafter referred to as volume C1 of the lower portion of the coil 2C) is different from volume C2 of the coil 2C that is located nearer than the central plane 70 of the inner insulator 13 in the stacking direction to the second outer insulator 62 (hereafter referred to as volume C2 of the upper portion of the coil 2C). That is, the number of turns of the lower portion of the coil 2C is different from the number of turns of the upper portion of the coil 2C.

Specifically, the lower portion of the coil 2C includes a first coil conductor layer 21 and a second coil conductor layer 22. The upper portion of the coil 2C includes a third coil conductor layer 23 and a fourth coil conductor layer 24. The number of turns of the first coil conductor layer 21 and the number of turns of the second coil conductor layer 22 are less than the number of turns of the third coil conductor layer 23 and the number of turns of the fourth coil conductor layer 24. Volume C1 of the lower portion of the coil 2C is smaller than volume C2 of the upper portion of the coil 2C. Regarding the relationship between volume A1 of the first outer insulator 61, volume A2 of the second outer insulator 62, volume C1 of the lower portion of the coil 2C, and volume C2 of the upper portion of the coil 2C, A1:A2=C2:C1 is satisfied. That is, volume A1 (thickness) of the first outer insulator 61 is larger than volume A2 (thickness) of the second outer insulator 62.

According to the above-described coil component 10E, when the volume of the lower portion of the coil 2C is smaller than the volume of the upper portion of the coil 2C, a difference in firing shrinkage behavior occurs between the upper portion and the lower portion of the inner insulator 13. The firing shrinkage behavior of the lower portion, in which the volume of the coil 2C is small as described above, of the inner insulator 13 approaches the firing shrinkage behavior of the inner insulator 13. Then, the volume of the first outer insulator 61 that is located at a position near the lower portion of the inner insulator 13 is increased. As a result, the firing shrinkage behavior of the lower portion of the inner insulator 13 can approach the entire firing shrinkage behavior of the first outer insulator 61 and the first inner magnetic body 11, and peeling between the inner insulator 13 and the first inner magnetic body 11 can be suppressed. In this regard, the volume of the upper portion and the volume of the lower portion of the coil 2C are made to differ from each other by making the number of turns of the upper portion of the coil 2C differ from the number of turns of the lower portion. However, the volume of the upper portion and the volume of the lower portion of the coil 2C may be made to differ from each other by making the thickness or line width of the upper portion and the thickness or line width of the lower portion of the coil 2C differ from each other.

EXAMPLES

Next, examples of the first, third, and fifth embodiments will be described.

When volume C of the coil was 5% or more and 20% or less (i.e., from 5% to 20%) of volume B of the inner insulator, occurrences of cracking and chipping in a product was made to be less than 5% in the first embodiment (FIG. 2) and the third embodiment (FIG. 6). Meanwhile, when neither the first outer insulator nor the second outer insulator was disposed in the first and third embodiments, occurrences of cracking and chipping in a product was 30% or more. When the outermost first and second outer insulators were disposed in the stacking direction in the first and third embodiments (corresponding to FIG. 8), occurrences of cracking and chipping in a product was 5% or more and less than 30% (i.e., from 5% to 30%).

When volume C of the coil was more than 20% and 70% or less (i.e., from 20% to 70%) of volume B of the inner insulator, occurrences of cracking and chipping in a product was made to be less than 5% in the fifth embodiment (FIG. 8). Meanwhile, when neither the first outer insulator nor the second outer insulator was disposed in the fifth embodiment, occurrences of cracking and chipping in a product was 5% or more and less than 30% (i.e., from 5% to 30%). When the first and second outer insulators were disposed so as to approach the inner insulator in the fifth embodiment (corresponding to FIG. 6), occurrences of cracking and chipping in a product was 30% or more.

When volume C of the coil was more than 70% of volume B of the inner insulator, occurrences of cracking and chipping in a product was made to be less than 5% in the first, third, and fifth embodiments without disposing the first outer insulator nor the second outer insulator.

In this regard, the present disclosure is not limited to the above-described embodiments, and the design can be changed within the scope of the present disclosure.

In the above-described embodiments, each of the primary coil and the secondary coil is composed of two coils. However, at least one of the primary coil and the secondary coil may be composed of one coil or three or more coils.

In the above-described embodiments, the common mode choke coil is used as the coil component. However, a single coil may be used. The coil includes four coil conductor layers but has only to include at least one coil conductor layer.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A coil component comprising:

a first outer insulator, a first inner magnetic body, an inner insulator, a second inner magnetic body, and a second outer insulator which are stacked sequentially in a stacking direction; and a coil disposed in the inner insulator, wherein regarding a relationship between a volume A of a total of the first outer insulator and the second outer insulator, a volume B of the inner insulator, a volume C of the coil, and a volume E of a total of the first inner magnetic body and the second inner magnetic body, $0.05 \le A \le 0.25$, $0.15 \le B \le 0.25$, $0.032 \le \le C \le 0.18$, and $0.33 \le E \le 0.77$ are satisfied, where $0.2B \le C \le 0.7B$ and $A+B+C+E=1$.

2. The coil component according to claim 1, wherein $0.1 \le A \le 0.2$, $0.175 \le B \le 0.225$, $0.037 \le C \le 0.16$, and $0.42 \le E \le 0.69$ are satisfied.

3. The coil component according to claim 1, wherein regarding a relationship between a volume A1 of the first outer insulator, a volume A2 of the second outer insulator, a volume C1 of the coil that is located nearer than a central plane of the inner insulator in the stacking direction to the first outer insulator, and a volume C2 of the coil that is located nearer than the central plane of the inner insulator in the stacking direction to the second outer insulator, C1 is different from C2, and A1:A2=C2:C1 is satisfied.

4. The coil component according to claim 3, wherein a number of turns of the coil located nearer than the central plane of the inner insulator in the stacking direction to the first outer insulator is different from a number of turns of the coil that is located nearer than the central plane of the inner insulator in the stacking direction to the second outer insulator.

5. The coil component according to claim 2, wherein regarding a relationship between a volume A1 of the first outer insulator, a volume A2 of the second outer insulator, a volume C1 of the coil that is located nearer than a central plane of the inner insulator in the stacking direction to the first outer insulator, and a volume C2 of the coil that is located nearer than the central plane of the inner insulator in the stacking direction to the second outer insulator, C1 is different from C2, and A1:A2=C2:C1 is satisfied.

6. The coil component according to claim 5, wherein a number of turns of the coil located nearer than the central plane of the inner insulator in the stacking direction to the first outer insulator is different from a number of turns of the coil that is located nearer than the central plane of the inner insulator in the stacking direction to the second outer insulator.

* * * * *